United States Patent
Bubel

[19]
[11] Patent Number: 6,044,711
[45] Date of Patent: Apr. 4, 2000

[54] FORCE SENSING APPARATUS

[75] Inventor: William L. Bubel, Exeter, Calif.

[73] Assignee: PSI-Tronix, Inc., Tulare, Calif.

[21] Appl. No.: 08/778,148

[22] Filed: Jan. 10, 1997

[51] Int. Cl.$^7$ .................................................. G01L 9/06
[52] U.S. Cl. ............................................. 73/721; 73/727
[58] Field of Search ........................... 73/721, 727, 754, 73/862.632, 777

[56] References Cited

U.S. PATENT DOCUMENTS

| | | |
|---|---|---|
| 3,034,345 | 5/1962 | Mason . |
| 3,049,685 | 8/1962 | Wright, Jr. . |
| 3,149,488 | 9/1964 | Castro ........................................ 73/777 |
| 3,492,513 | 1/1970 | Hollander, Jr. et al. . |
| 3,828,294 | 8/1974 | Baba et al. . |
| 4,019,388 | 4/1977 | Hall, II et al. ............................ 73/754 |
| 4,065,970 | 1/1978 | Wilner ........................................ 73/727 |
| 4,222,277 | 9/1980 | Kurtz et al. ............................... 73/721 |
| 4,320,664 | 3/1982 | Rehn et al. . |
| 4,511,878 | 4/1985 | Shimada et al. .......................... 73/777 |
| 4,553,436 | 11/1985 | Hansson . |
| 4,554,927 | 11/1985 | Fussell ...................................... 73/727 |
| 4,592,238 | 6/1986 | Busta ........................................ 73/727 |
| 4,691,575 | 9/1987 | Sondregger et al. ................. 73/721 X |
| 4,718,287 | 1/1988 | Mishliborsky ..................... 73/862.632 |
| 4,823,606 | 4/1989 | Malicki .............................. 73/862.632 |
| 4,891,985 | 1/1990 | Glenn . |
| 5,024,097 | 6/1991 | Graeger et al. ...................... 73/721 X |
| 5,024,107 | 6/1991 | Bethe ................................. 73/862.632 |
| 5,058,435 | 10/1991 | Terry et al. . |
| 5,058,436 | 10/1991 | Bellec et al. ............................. 73/727 |
| 5,076,106 | 12/1991 | Buddwalk .......................... 73/862.632 |
| 5,081,437 | 1/1992 | Mosser et al. . |
| 5,168,192 | 12/1992 | Kosugi et al. ............................ 73/715 |
| 5,264,820 | 11/1993 | Kovacich et al. ..................... 73/727 X |
| 5,351,542 | 10/1994 | Ichimura et al. . |
| 5,578,528 | 11/1996 | Wuu et al. ............................ 73/754 X |
| 5,587,601 | 12/1996 | Kurtz ..................................... 73/721 X |
| 5,614,678 | 3/1997 | Kurtz et al. ........................... 73/721 X |
| 5,632,854 | 5/1997 | Mirza et al. ............................... 438/53 |

FOREIGN PATENT DOCUMENTS

| | | |
|---|---|---|
| 3436-440 | 4/1986 | Germany . |
| 5-45244 | 2/1993 | Japan . |

*Primary Examiner*—Harshad Patel
*Assistant Examiner*—Robin Clark
*Attorney, Agent, or Firm*—Worrel & Worrel

[57] ABSTRACT

A sensing apparatus having a body member with a portion engageable with a work object having a medium to be sensed; and a system for registering at predetermined criterion, relative to the body member, during engagement of the portion of the body member with the work object, as an index of the medium. A method for manufacturing a resultant work piece having at least one projection thereon, the method including the steps of cutting a first work material to form the projection on a portion of the first work material, mounting the projection on a second work material and removing the remainder of the first work material from the projection to form the resultant work piece.

22 Claims, 4 Drawing Sheets

FORCE SENSING APPARATUS

BACKGROUND OF THE INVENTION

1. Field of the Invention

The present invention relates to a sensing apparatus and, more particularly, to such a sensing apparatus which is capable of monitoring predetermined conditions to be sensed in a wide variety of environments with a stability and immunity from error not heretofore achieved in the art.

2. Description of the Prior Art

With technological advance comes the accompanying necessity for maintaining control over an increasing number and variety of subsystems. The necessity for this capability becomes increasingly important with the prolixity of the subsystems involved. Similarly, this necessity is increasingly more important with the sensitivity of the subsystems and is dependent, as well, upon the ranges of operation required and the tolerances which may be acceptable. Thus, for example, if the particular device under consideration is an automotive vehicle, the number of subsystems and the ranges and tolerances of acceptable operation may be relatively benign. Alternatively, if the particular device is a jet aircraft or a space vehicle, the numbers of subsystems and the ranges and tolerances of acceptable operation may be significantly more critical and unforgiving. Accordingly, the use of accurate and reliable sensors for monitoring such subsystems has become of critical importance in the satisfactory operation of an ever increasing number and variety of devices upon which society depends.

A wide variety of types of sensors have conventionally been known including those which are purely mechanical, as well as those which are electromechanical, electronic and electrochemical. There are also those which have a redundant capability. Such conventional sensors have been plagued by a number of characteristic problems which severely hamper their reliability in use. Among these is a variety of strain gauges, or pressure transducers, which have been employed in the measurement of pressure. These have included gauges which can be classified generally as expansible metallic-element gauges and electrical pressure transducers. Pressure transducers may be subclassified as including resistive pressure transducers, strain gauge pressure transducers, magnetic pressure. transducers, crystal pressure transducers and capacitive pressure transducers. These can further be subcategorized, but to varying degrees all such conventional devices suffer from certain deficiencies including instability due to physical shock, attitudinal variation, thermal deviation and the like. These are all conditions which are experienced in such critical operative environments as aircraft and space craft and in which the margin for error, both in terms of time and degree, is minuscule.

Therefore, it has long been known that it would be desirable to have a sensing apparatus which is particularly well suited to use as a universally adaptable measuring apparatus for a wide variety of operative environments; which is readily suited to usage in a plurality of subsystems in a given operational environment so as to establish a uniformly reliable and comparable source of information for the specific operational environment; which possesses a stability and immunity to thermal deviation not heretofore achieved in the art; which is uniquely well suited to providing readily usable data to conventional monitoring systems as well as more nonconventional monitoring systems; which is of minimal cost and weight while being precisely accurate in a wide variety of operative environments; and which is otherwise entirely successful in achieving its operational objectives.

SUMMARY OF THE INVENTION

Therefore, it is an object of the present invention to provide an improved sensing apparatus.

Another object is to provide such a sensing apparatus which is well suited to usage in a wide variety of operative environments and is adaptable for such usage in sensing a variety of forces under a plurality of operative conditions.

Another object is to provide such a sensing apparatus which is capable of dependable operation under a wide variety of operative conditions including sever dynamics tresses, thermal variation and the like.

Another object is to provide such a sensing apparatus which is readily suited to usage in multiples individually on a plurality of subsystems in a given operational environment so as to establish a uniformly reliable and comparable source of information for the specific operational environment.

Another object is to provide such a sensing apparatus which is uniquely well suited to providing readily usable data to conventional monitoring systems as well as more nonconventional monitoring.

Another object is to provide such a sensing apparatus which is of minimal cost and weight while being precisely accurate.

Another object is to provide such a sensing apparatus which possesses an inherent stability and immunity from otherwise disruptive influences.

Further objects and advantages are to provide improved elements and arrangements thereof in an apparatus for the purpose described which is dependable, economical, durable and fully effective in accomplishing its intended purposes.

Another object is to provide a method for the construction of a work piece, such as the sensing apparatus of the present invention, which is operable inexpensively and dependably in the manufacture of such work pieces and wherein the resulting work pieces are durable and fully effective in accomplishing their operative objectives.

These and other objects and advantages are achieved, in the preferred embodiment of the present invention, in a sensing apparatus having a body member with a portion engageable with a work object having a medium to be sensed; and means for registering a predetermined criterion relative to the body member, during engagement of the portion of the body member with the work object, as an index of the medium.

DESCRIPTION OF THE PREFERRED EMBODIMENT

Figure 1:
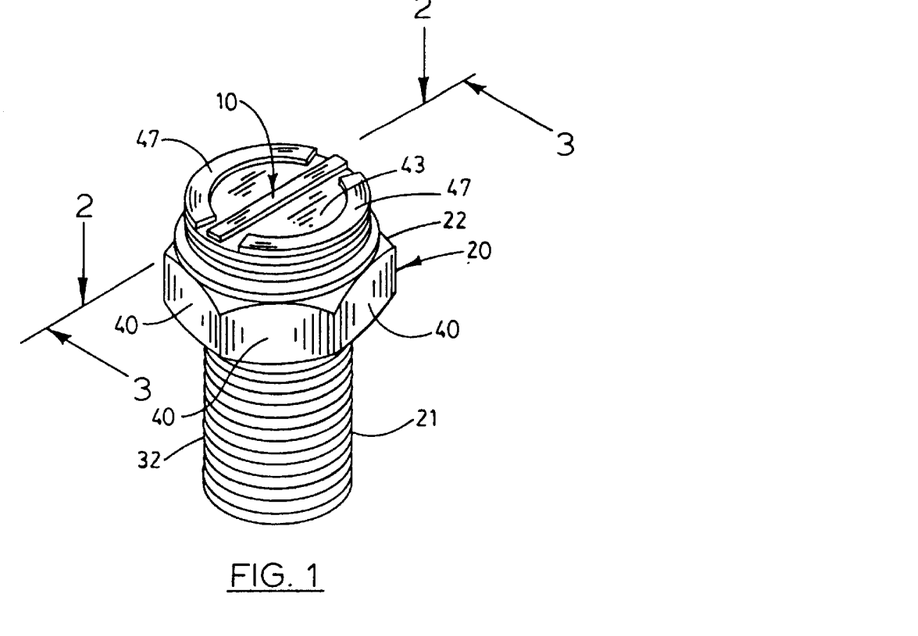
FIG. 1 is a perspective view of the sensing apparatus of the present invention employed in a representative operative environment shown mounted on a pressure plug adapted to be connected to a pressurized fluid system.

Referring more particularly to the drawings, the sensing apparatus of the present invention is generally indicated by the numeral 10 in FIG. 1. The sensing apparatus of the present invention is adapted for usage in a wide variety of operative environments as well as for usage in the sensing and transmission of a variety of types of data. While the particular operative environment and desired data, of course, influence the preferred structure of the preferred embodiment of the invention which is adopted therefor, the embodiment of the sensing apparatus shown in FIGS. 1, 2, 3 and 4 is uniquely well suited to use in many operative environments including the representative operative environment depicted in FIGS. 1, 2 and 3.

Figure 2:
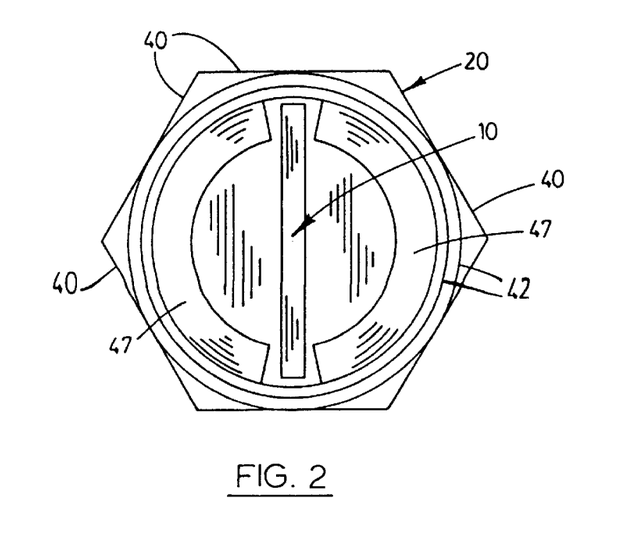
FIG. 2 is a somewhat enlarged, top plan view taken from a position indicated by line 2—2 in FIG. 1 and showing the pressure plug mounting the sensing apparatus of the present invention.
Figure 3:
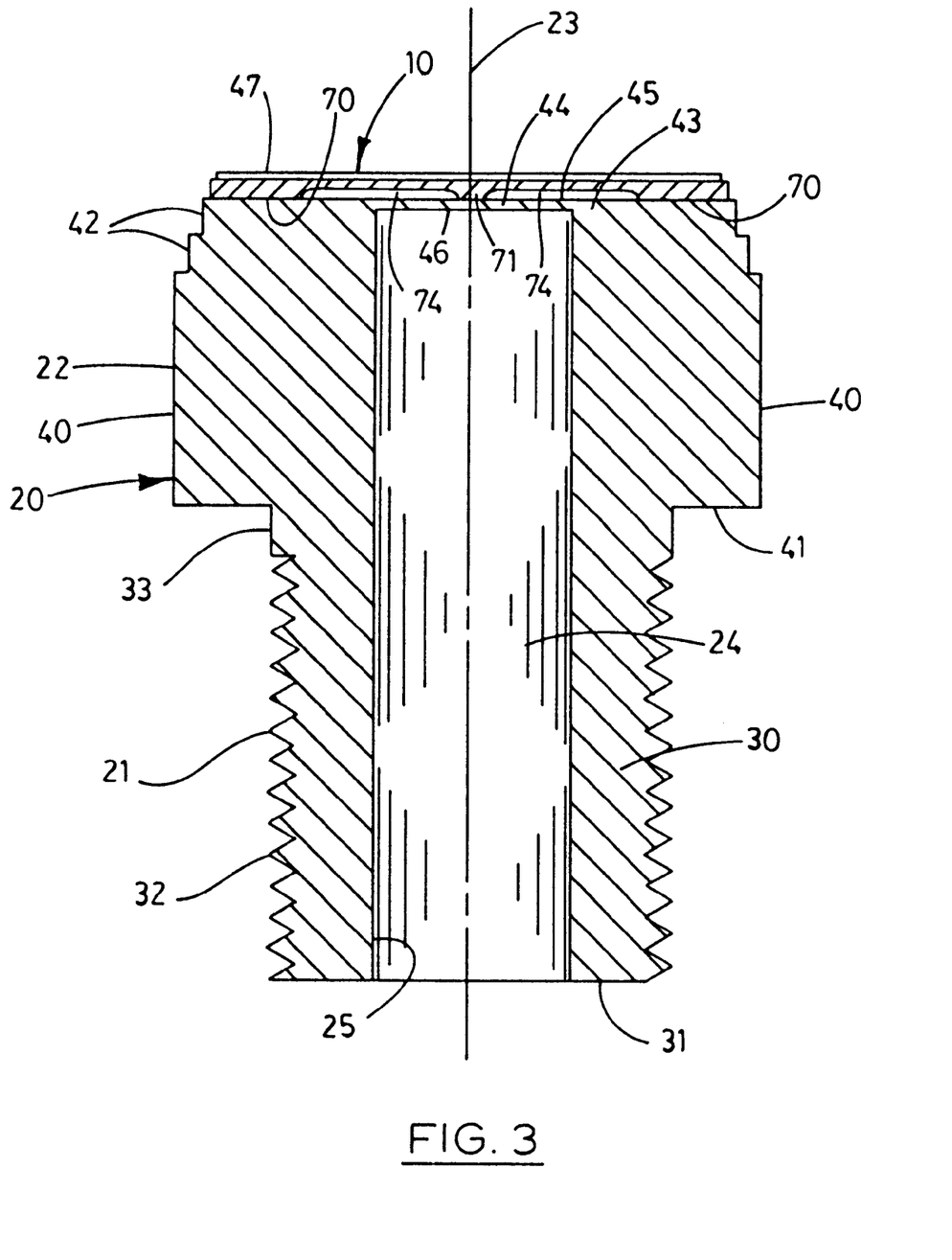
FIG. 3 is a somewhat further enlarged, transverse vertical section taken on line 3—3 in FIG. 1.

In the operative environment of FIGS. 1, 2 and 3, a work object, pressure bolt or plug is generally indicated by the numeral 20. It will be understood that the pressure plug is fabricated from a suitable metal and is employed in conjunction with a pressurized fluid system, not shown, wherein, for example, the pressure plug is screw-threadably secured in a screw threaded bore of the pressure system so that the pressure plug seals the screw threaded bore and the fluid system, but is, as will hereinafter be described, in contact with fluid pressure therewithin. It will also be understood that the particular fluid housed within the pressurized fluid system can be virtually any pressurizable fluid including liquids, gases and combinations thereof.

The pressure plug 20 has a cylindrical shaft portion 21 and a contiguous head portion 22. The shaft portion and head portion are oriented along a common longitudinal axis 23. A pressure chamber or passage 24 extends through the shaft portion and head portion concentric to the longitudinal axis 23. The pressure passage is bounded by a cylindrical surface 25 which is concentric to the longitudinal axis 23.

The shaft portion 21 of the pressure plug 20 has a cylindrical wall 30 terminating at one end portion in a lower surface or annulus 31. The shaft portion has an externally screw threaded outer surface 32 which is concentric to the longitudinal axis 23 and an upper cylindrical surface 33 which is also concentric to the longitudinal axis 23.

The head portion 22 of the pressure plug 20 is bounded laterally by six (6) planar surfaces to form an hexagonal configuration for the head portion. The head portion has a lower annular seat defining a plane right angularly related to the longitudinal axis 23. Stepped annular shoulders 42 extend above the planar surfaces 40 concentric to the longitudinal axis 23 and defining planes right-angularly related thereto. Mounted on the annular shoulders 42 is an upper wall or metal diaphragm 43 which extends across the annular shoulders defining a plane right-angularly related to the longitudinal axis 23 and sealing the pressure passage 24. It will be understood that the thickness and construction of the diaphragm is such that it is responsive to fluid pressure within the pressurized fluid system by pressure exerted against a central portion 44 of the diaphragm extending across the pressure passage. Thus, the diaphragm is marginally deformable under the influence of the fluid pressure applied thereagainst and such deformation corresponds to the extent of the fluid pressure applied thereagainst. The diaphragm has an exterior surface 45 and an opposite interior surface 46. A pair of arcuate plates 47 are mounted on the exterior surface 45 of the diaphragm immediately adjacent to the periphery thereof and secured in such a fashion as securely to retain the diaphragm in the mounted position shown in the drawings and described herein in sealing relation to the pressure passage 24.

Figure 4:
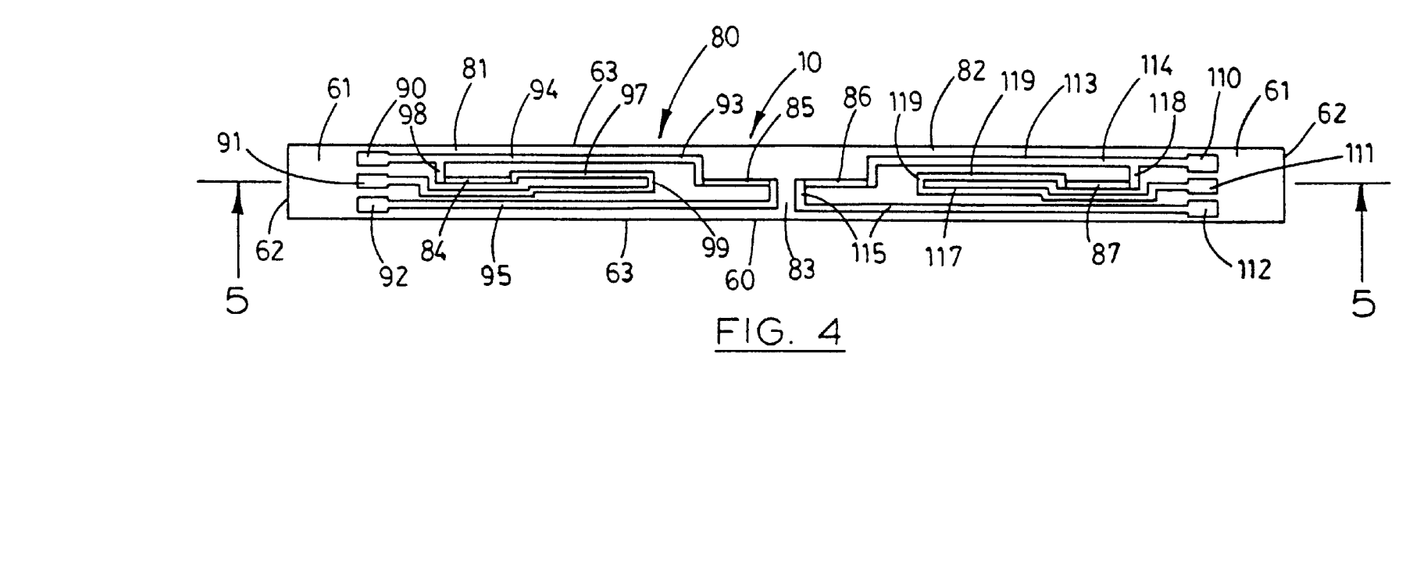
FIG. 4 is a still further enlarged, top plan view of the sensing apparatus of the present invention and showing the electrical system implanted on the upper surface thereof.
Figure 5:
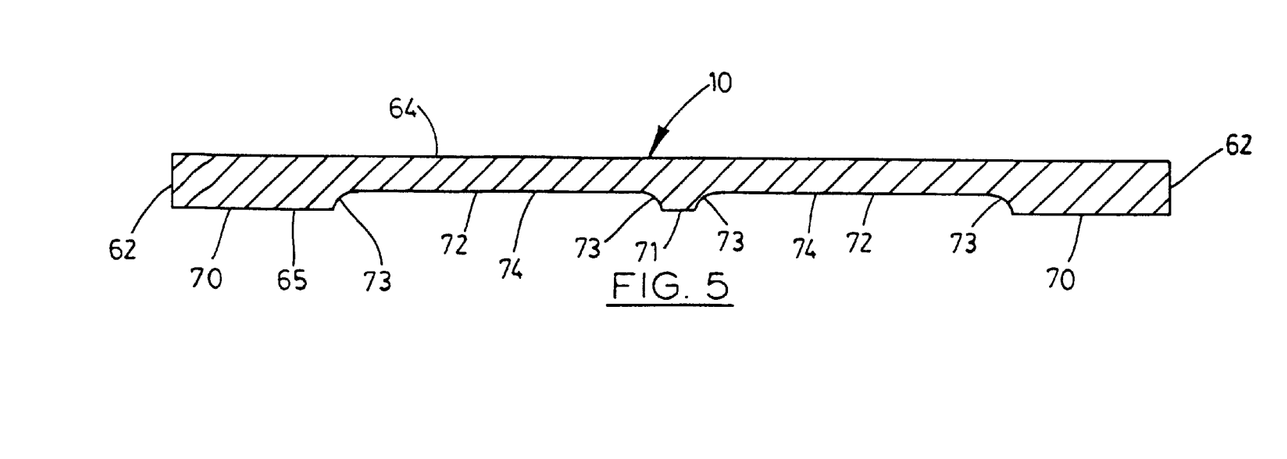
FIG. 5 is a longitudinal vertical section taken on line 5—5 in FIG. 4.

Referring then more particularly to the sensing apparatus 10 of the present invention, the sensing apparatus has a body member, or beam 60 best shown in FIGS. 4 and 5. The beam can generally be viewed as having opposite end portions 61 which individually terminate in end edges 62 and parallel lateral edges 63. The beam has a flat upper surface 64 and an opposite lower surface 65 of a configuration hereinafter to be described and which is shown in FIGS. 3 and 5.

The beam 60 can be constructed in a variety of different forms by a variety of methods and of a variety of different materials. In the preferred embodiment the beam is constructed from an upper silicon layer with lower projections constructed of a glass layer using the method of manufacture of the present invention hereinafter to be described. However, the invention hereof is not limited to this particular embodiment and so will be described, at this point, as a resultant product rather than in terms of its method of manufacture.

As perhaps best shown in FIG. 5, the lower surface 65 of the beam 60 has a pair of lateral pads or supports 70 formed in the lower surface individually adjacent to the opposite end portions 61 and extending individually to the end edges 62 of the beam. A central projection, pad or support 71 is formed in the lower surface of the beam midway between the lateral supports 70. The lower surfaces of the lateral support 70 and central support 71 define a plane which is parallel to the upper surface 64 of the beam. Between each lateral support 70 and the central support 71 is a recessed surface 72 defining a plane parallel to the upper surface and recessed from the lateral supports and central support, as shown in FIG. 5. Each of the recessed surfaces is bounded by concave shoulder surfaces 73 of the adjacent lateral support and central support. Each lateral support, central support and recessed surface defines a recessed area 74 extending between its respective lateral support and central support.

As best shown in FIG. 4, the sensing apparatus 10 has an electrical system generally indicated by the numeral 80 in FIG. 4. More specifically, the electrical system can be viewed as including a left electrical circuit, generally indicated by the numeral 81, and a right electrical circuit, generally indicated by the numeral 82. A gap 83 exists on the upper surface 64 of the beam 60 between the left and right electrical circuits. The left electrical circuit has a first piezoresistive sensing element 84 and a second piezoresistive sensing element 85. The right electrical circuit has a third piezoresistive sensing element 86 and a fourth piezoresistive sensing element 87. The piezoresistive sensing elements 84, 85, 86 and 87, respectively, are aligned along the longitudinal axis of the beam 60 in predetermined spaced relation on the upper surface 64 of the beam.

The left electrical circuit 81, as shown in FIG. 4, has a first electrical contact pad 90, a second electrical contact pad 91 and a third electrical contact pad 92. In the preferred embodiment, the contact pads are disposed in side by side relation on the upper surface 64 of the beam 60 adjacent to the opposite end portion 61 on the left, as viewed in FIG. 4. In addition, in the preferred embodiment, the contact pads are constructed of sintered aluminum. The left electrical circuit 81 has a first electrically conductive trace 93 which interconnects the first electrical contact pad 90 and the third electrical contact pad 92 through the second piezoresistive sensing element 85. More specifically, the electrically conductive trace 93 has a first segment 94 extending from the first electrical contact pad 90 to the second piezoresistive sensing element. A second segment interconnects the second piezoresistive sensing element 85 and the third electrical contact pad 92. A second electrically conductive trace 97 operably interconnects the first segment 94 of the first electrically conductive trace 93 and the second electrical contact pad 91 through the first piezoresistive sensing element 84. More specifically, a first segment 98 interconnects the first segment 94 of the first electrically conductive trace 93 and the first piezoresistive sensing element. A second segment 99 interconnects the first piezoresistive sensing element 84 and the second electrical contact pad 91.

Similarly, the right electrical circuit 82 has a first electrical contact pad 110, a second electrical contact pad 111 and a third electrical contact pad 112 positioned in side by side relation on the upper surface 64 of the opposite end portion 61 of the beam 60 on the right, as viewed in FIG. 4. In the preferred embodiment, the first, second and third electrical contact pads are constructed of sintered aluminum.

The right electrical circuit 82 has a first electrically conductive trace 113 which operably interconnects the first electrical contact pad 110 and the third electrical contact pad 112 through the third piezoresistive sensing element 86. More specifically, the electrically conductive trace 113 includes a first segment 114 which operably interconnects the first electrical contact pad 110 and the third piezoresistive sensing element. A second segment 115 operably interconnects the third piezoresistive sensing element and the third electrical contact pad 112. As can be seen in FIG. 4, the second piezoresistive sensing element 85 of the left electrical circuit 81 and the third piezoresistive sensing element 86 of the right electrical circuit 82 are wired in side by side relation on opposite sides of the gap 83. It will also be seen, upon reference to FIGS. 4 and 5, that the gap 83 is positioned on the upper surface 64 directly above the central support 71.

The right electrical circuit 82 has a second electrically conductive trace 117 which operably interconnects the first segment 114 of the first electrically conductive trace 113 and the second electrical contact pad 111. More specifically, the second electrically conductive trace 117 includes a first segment 118 interconnecting the first segment 114 and the fourth piezoresistive sensing element 87. A second segment 119 operably interconnects the fourth piezoresistive sensing element and the second electrical contact pad 111.

Preferably, although not necessarily, in the preferred embodiment of the invention, the beam, as previously noted, is constructed with an upper silicon layer. The left electrical circuit 81 and right electrical circuit 82 are preferably ion implanted with a P type dopant and are annealed to produce the desired electrical properties.

Similarly, preferably, although not necessarily, the left and right electrical circuits are connected through conductors appropriately connected to the first, second and third electrical contact pads 90, 91 and 92, respectively, and the first, second and third electrical contact pads 110, 111 and 112 to a data gathering and processing system. Preferably this processing system employs a Wheatstone bridge and utilizes a constant current excitation to the electrical system 80 of the sensing apparatus to produce an analog output of the applied force, as hereinafter described.

Still further, preferably, although not necessarily, the silicon layer of the preferred embodiment of the sensing apparatus is fabricated from a four (4) inch diameter N type silicon wafer. The silicon wafer is micro machined and cut from the four (4) inch diameter wafer into the configuration shown in FIG. 4 using diamond saws. The actual size of one of the beams in the illustrative embodiment is approximately 0.580 inches in length and 0.040 inches in width. This is, however, determined by the particular operative environment and application to which the sensing apparatus is adapted as well as to the preferences of the manufacturers and users.

Figure 6:
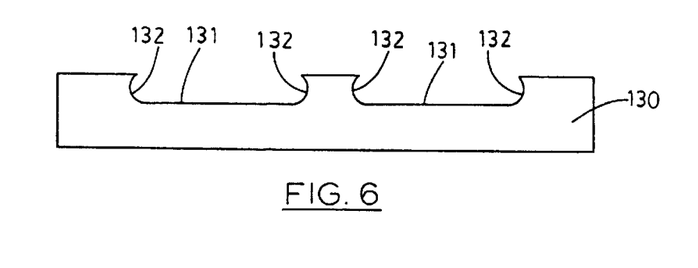
FIG. 6 is a side elevation showing a glass wafer and illustrating a first step in the method for manufacturing a work piece of the present invention.

Referring more particularly to FIGS. 6, 7, 8 and 9, a method of manufacture of a work piece is schematically illustrated therein. The method hereof has beneficial use in manufacturing the sensing apparatus of the present invention as well as other types of work pieces. It will be understood that the elements shown and described in FIGS. 6, 7, 8 and 9 are merely diagrammatically illustrated in those views for purposes of disclosing this method of manufacture. Thus, as shown in FIG. 6, a glass wafer is generally indicated by the numeral 130. The glass wafer, before practice of the first step of the method of the invention shown in FIG. 6, is simply a sheet of glass, in wafer form, having parallel opposite surfaces. The glass wafer 130 is etched in two etching areas 131 to cut into the upper surface of the glass wafer to a predetermined depth substantially corresponding to the desired distance that the lateral supports 70 and central support 71 of the sensing apparatus 10 are to extend below the beam 60. The etching is performed by any suitable means, but preferably forms concave lateral surfaces 132 bounding each etching area and thereby constituting the shoulder surfaces 73 of the lateral support 70 and central support 71, as will be seen.

Figure 7:
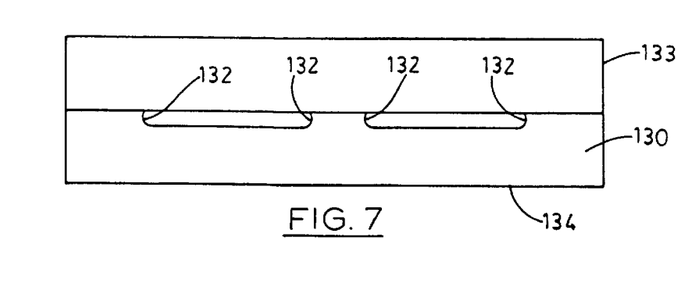
FIG. 7 is a side elevation of the glass wafer of FIG. 6 mounting a silicon wafer and illustrating a second step in the process of manufacture of the present invention.
Figure 8:
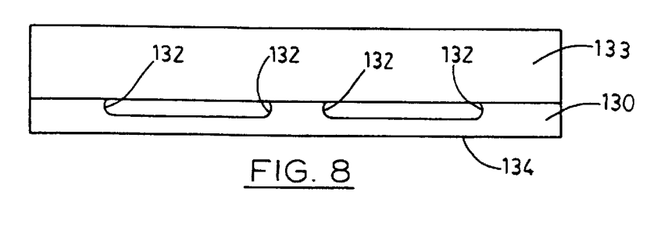
FIG. 8 is a side elevation of the glass wafer and silicon wafer of FIG. 7 illustrating a third step in the method of manufacture of the present invention.
Figure 9:
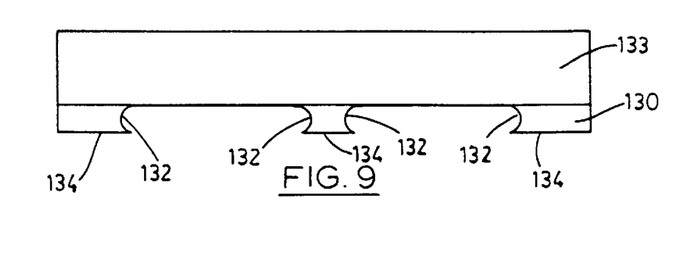
FIG. 9 is a side elevation of the glass wafer and silicon wafer of FIGS. 7 and 8 illustrating a fourth step in the method of manufacture of the present invention.

In further practice of the method of the present invention, and as diagrammatically illustrated in FIG. 7, an N type silicon wafer 133 is bonded to the glass wafer 130 by any suitable means such as the use of suitable glass bonding technologies. Finally, as illustrated in FIGS. 8 and 9, etching by any suitable means is preformed upon the etching surface 134 to reduce, or remove, the remainder of the glass wafer so as to leave the lateral supports 70 and central support 71 as shown in FIGS. 5 and 9. It has been discovered that since the shoulder surfaces 73 of the lateral supports 70 and central support 71 are concave and thus join the lower surface of the silicon wafer in the relation shown, the susceptibility of the silicon layer to fracture at the point of juncture due to the brittle nature of the silicon layer is substantially reduced.

OPERATION

The operation of the described embodiment of the present invention is believed to be clearly apparent and is briefly summarized at this point.

In the illustrative operative environment shown in FIGS. 1, 2 and 3, the sensing apparatus 10 is mounted on the exterior surface 45 of the metal diaphragm 43 so as to extend thereacross between the arcuate plates 47. More specifically, the lateral supports 70 are individually mounted on the exterior surface of the diaphragm on opposite sides of the central portion 44 of the diaphragm and the central support 71 is mounted on the central portion 44 of the diaphragm, preferably in alignment with the longitudinal axis 23. The manner in which the sensing apparatus is mounted in the position described can be by any suitable means, such as the use of a suitable adhesive or other bonding agent.

The sensing apparatus 10 is connected to a suitable data gathering and processing system, not shown, which, as previously noted, preferably includes a Wheatstone bridge for purposes of registering the measurements detected by the sensing apparatus.

Also as previously noted, during operation of the sensing apparatus 10 the electrical system 80 is electrically energized from the processing system so that the left electrical circuit 81 and right electrical circuit 82 are constantly electrically excited. This operable condition continues for as long as the sensing apparatus is employed.

The pressurized fluid system with which the pressure passage 24 is in contact, causes force to be applied in a uniform pressure to the central portion 44 of the metal diaphragm 43. The pressure is measured by changes in electrical resistance in the electrical system 80 as a function of the pressure within the pressure passage 24 and as detected by the central portion 44 of the metal diaphragm applied directly to the central support 71 of the beam 60. Thus, the beam 60 flexes in direct response to movement of the central portion of the metal diaphragm causing the variation in electrical resistance. This produces an analog output of the applied force which is transmitted to the processing system, not shown, and interpreted based on the operation of the Wheatstone bridge.

Therefore, the sensing apparatus of the present invention is particularly well suited to use as a universally adaptable measuring apparatus for a wide variety of operative environments; is readily suited to usage in a plurality of subsystems in a given operational environment so as to establish a uniformly reliable and comparable source of information for the specific operational environment; possesses a stability and immunity to thermal deviation not heretofore achieved in the art; is uniquely well suited to providing readily usable data to conventional monitoring systems as well as more nonconventional processing systems; is of minimal cost and weight while being precisely accurate; and is otherwise entirely successful in achieving its operational objectives.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A force sensing apparatus comprising a deformable elongated body member having a portion engageable with a work object having a medium to be sensed and so constructed as to form a second portion mounted in spaced relation to said portion engageable with the work object; and means for registering a predetermined criterion relative to said body member, during engagement of said portion of the body member with the work object, as an index of said medium.

2. The force sensing apparatus of claim 1 wherein said second portion of the body member in spaced from the portion engageable with the work object and is substantially isolated from registering said predetermined criterion so as to constitute a basis for said measuring.

3. The force sensing apparatus of claim 1 wherein said registering means includes an electrical circuit energizable to register said predetermined criterion.

4. The force sensing apparatus of claim 1 wherein said body member includes a silicon layer mounting said portion engageable with the work object and said registering means.

5. The force sensing apparatus of claim 1 wherein said body member includes silicon and glass laminae deformable for registering said predetermined criterion.

6. The force sensing apparatus of claim 5 wherein said glass lamina includes said portion engageable with the work object.

7. The force sensing apparatus of claim 6 wherein said silicon lamina mounts said registering means.

8. The force sensing apparatus of claim 7 wherein said registering means includes an electrical circuit energizable to register deformation of the body member while said portion of the body member is in engagement with the work object as an index of said medium.

9. The for sensing apparatus of claim 8 wherein said electrical circuit includes piezoresistive sensing elements.

10. A force sensing apparatus comprising a body member having a portion engageable with a work object having a medium to be sensed wherein said body member includes silicon and glass laminae deformable for registering said predetermined criterion and having a portion engageable with the work object and wherein said glass laminae is etched to form a pair of second portions mounted on the work object in spaced relation to said portion engageable with the work object for registering said predetermined criterion; and means for registering a predetermined criterion relative to said body member, during engagement of said portion of the body member with the work object, as an index of said medium.

11. The force sensing apparatus of claim 10 wherein said medium is a pressurized fluid contained by a pressure responsive wall of the work object and said portion of the body member engageable with the work object is engageable with said pressure responsive wall of the work object.

12. A force sensing apparatus for detecting the force applied to a predetermined work surface of a work object, the force sensing apparatus comprising:

A. a deformable elongated body member having a silicon layer, a pair of spaced supports adapted to be mounted on said work object on opposite sides of said work surface and a pad between the supports of said pair of supports for engagement with said work surface; and B. an electrical system, having piezoresistive sensing elements, energizable to register the position of said body member, caused by said work surface of the work object, so as to detect said force applied to the work surface.

13. The force sensing apparatus of claim 12 wherein said supports and pad are formed by a glass layer bonded to said silicon layer and which has been etched so as substantially to leave only the supports and pad of the glass layer on said silicon layer.

14. The for sensing apparatus of claim 13 wherein said glass layer is etched prior to mounting the glass layer on said silicon layer to form said supports and pad and is subsequently etched after mounting the glass layer on the silicon layer from a surface thereof opposite said supports and pad to remove substantially all of the glass layer except said supports and pad.

15. The force sensing apparatus of claim 14 wherein said glass layer is etched to form said supports and pad in such a manner as to form concave lateral surfaces for said supports and pad which, when mounted on the silicon layer, are resistant to fracture of said silicon layer.

16. The force sensing apparatus of claim 13 wherein said supports are individually adhesively mounted on the work object on opposite sides of said work surface and the pad is adhesively mounted on the work surface.

17. The force sensing apparatus of claim 12 wherein said electrical system includes said piezoresistive sensing elements operably interconnect with conductive traces forming a pair of electrical circuits mounted on said silicon layer.

18. The force sensing apparatus of claim 17 wherein said electrical circuits of the electrical system are operably connected to a Wheatstone bridge, are energizable to maintain a substantially continuous electrical excitation and are connected to a system operable to produce an analog output of the force applied against the work surface of the work object.

19. The re sensing apparatus of claim 18 wherein said piezoresistive sensing elements and said conductive traces are ion implanted on said silicon layer with a P type dopant and annealed to produce predetermined electrical properties.

20. The force sensing apparatus of claim 19 wherein said piezoresistive sensing elements and said conductive traces are operably connected to sintered aluminum contact pads which are operably connected to said Wheatstone bridge.

21. The force sensing apparatus of claim 20 wherein said silicon layer is constructed of N type silicon.

22. The force sensing apparatus of claim 21 wherein said work object is a pressure plug having a nondeformable housing bounding a chamber connected to a fluid under a pressure to be monitored and overlaid by a diaphragm deformable in response to said fluid pressure and in which said supports of the body member are mounted on the housing of the pressure plug and said pad of the body member is mounted on the diaphragm for movement therewith.

* * * * *

UNITED STATES PATENT AND TRADEMARK OFFICE
CERTIFICATE OF CORRECTION

PATENT NO. : 6,044,711
DATED : April 4, 2000
INVENTOR(S) : WILLIAM L. BUBEL

It is certified that error appears in the above-identified patent and that said Letters Patent is hereby corrected as shown below:

ABSTRACT, line 3, after registering, delete "at" and substitute
---a---;

Column 2, lines 11 & 12, delete "sever dynamics tresses" and substitute
---severe dynamic stresses---;

Column 7, line 61, delete "in" and substitute
---is---;

Column 8, line 6, delete "for" and substitute
---force---;

Column 8, line 54, delete "for" and substitute
---force---; and

Column 9, line 14, delete "re" and substitute
---force---.

Signed and Sealed this

Twentieth Day of February, 2001

Attest:

NICHOLAS P. GODICI

Attesting Officer

Acting Director of the United States Patent and Trademark Office